(12) United States Patent
Huang et al.

(10) Patent No.: US 10,958,163 B2
(45) Date of Patent: Mar. 23, 2021

(54) DERIVING POWER OUTPUT FROM AN ENERGY HARVESTER

(71) Applicant: Intel Corporation, Santa Clara, CA (US)

(72) Inventors: Lilly Huang, Portland, OR (US); Christopher Schaef, Hillsboro, OR (US); Vaibhav Vaidya, Portland, OR (US); Suhwan Kim, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/820,555

(22) Filed: Mar. 16, 2020

(65) Prior Publication Data

US 2020/0220457 A1  Jul. 9, 2020

Related U.S. Application Data

(63) Continuation of application No. 15/076,444, filed on Mar. 21, 2016, now Pat. No. 10,615,685.

(51) Int. Cl.
*H02M 3/07* (2006.01)
*H02M 3/158* (2006.01)
(Continued)

(52) U.S. Cl.
CPC .......... *H02M 3/07* (2013.01); *H02J 7/34* (2013.01); *H02M 3/1582* (2013.01); *H02M 2001/007* (2013.01)

(58) Field of Classification Search
CPC ..................................................... H02M 3/07
See application file for complete search history.

(56) References Cited

U.S. PATENT DOCUMENTS 7,847,431 B2 * 12/2010 Hu .......................... H02P 9/102
307/44
8,975,784 B2    3/2015 Tardy
(Continued)

FOREIGN PATENT DOCUMENTS

CN    203859576 U    10/2014
CN    104204985 A    12/2014
(Continued)

OTHER PUBLICATIONS

Lilly Huang et al., "Power Architecture & Management Scheme for IoT Applications", U.S. Appl. No. 14/977,257, filed Dec. 21, 2015, 39 pages.
(Continued)

*Primary Examiner* — Hai L Nguyen
(74) *Attorney, Agent, or Firm* — Schwabe, Williamson & Wyatt, P.C.

(57) ABSTRACT

Apparatuses, methods and storage medium associated with deriving power output from an energy harvester are disclosed herein. In embodiments, an apparatus may include one or more processors, devices, and/or circuitry to identify a plurality of times at which an intermediate voltage of a two stage power conversion circuit corresponds to a voltage reference, and ascertain an amount of time between one of the identified times and another one of the identified times. The one or more processors, devices, and/or circuitry may derive a power or current value associated with the second power supply using the amount of time.

20 Claims, 6 Drawing Sheets

(51) Int. Cl.
*H02J 7/34* (2006.01)
*H02M 1/00* (2006.01)

(56) References Cited

U.S. PATENT DOCUMENTS

| | | | |
|---|---|---|---|
| 9,812,954 B1 | 11/2017 | Kose et al. | |
| 10,615,685 B2* | 4/2020 | Huang | ................... H02J 7/34 |
| 2012/0293021 A1 | 11/2012 | Teggatz et al. | |

FOREIGN PATENT DOCUMENTS

| | | |
|---|---|---|
| CN | 104205624 A | 12/2014 |
| JP | 2004023993 A | 1/2004 |
| JP | 2011055593 A | 3/2011 |
| JP | 5517529 B2 | 6/2014 |
| KR | 1020110053681 A | 5/2011 |
| WO | 2011089483 A1 | 7/2011 |

OTHER PUBLICATIONS

International Search Report and Written Opinion dated May 22, 2017 for International Application No. PCT/US2017/017805, 11 pages.
United States Patent Office- Office Action dated Aug. 2, 2019 from U.S. Appl. No. 15/076,444, 10 pages.
United States Patent Office—Notice of Allowance dated Dec. 11, 2019 from U.S. Appl. No. 15/076,444, 7 pages.

\* cited by examiner

DERIVING POWER OUTPUT FROM AN ENERGY HARVESTER

RELATED APPLICATIONS

This application is a continuation of U.S. patent application Ser. No. 15/076,444, entitled "DERIVING POWER OUTPUT FROM AN ENERGY HARVESTER" filed on Mar. 21, 2016, and claims priority to the Ser. No. 15/076,444 application. The entire contents of the Ser. No. 15/076,444 application is incorporated herein by reference.

TECHNICAL FIELD

The present disclosure relates to powering electronic devices using an energy harvester.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Energy scavenging from an ambient source such as a photovoltaic cell (PV), a radio frequency (RF) device, a thermoelectric generator (TEG), or a piezoelectric material (such as lead zirconate titanate) is particularly suited for use in IoT (Internet of Things) products and applications. The Internet of Things (IoT) is the network of physical objects or "things" embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Energy scavenging may be utilized in an IoT application where on-line utility power is not reachable and an off-line stand-alone battery does not fit due to constrains in size and/or weight.

An energy harvesting source may have power characteristics different from a traditional power supply. For instance, total power available may be capped and/or the amount of power may depend on internal I-V characteristics rather than a load demand as the case in other power supplies. Maximizing power output from an energy harvesting source may involve constantly directly measuring the power at the output of the energy harvesting sources. These direct measurements may utilize current sensing (which may result in power losses), may utilize components that significantly contribute to physical dimensions of an electronic device (such as volume or area of the electronic device), and/or may utilize components that increase production costs, such as a bill of materials (BOM) cost.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
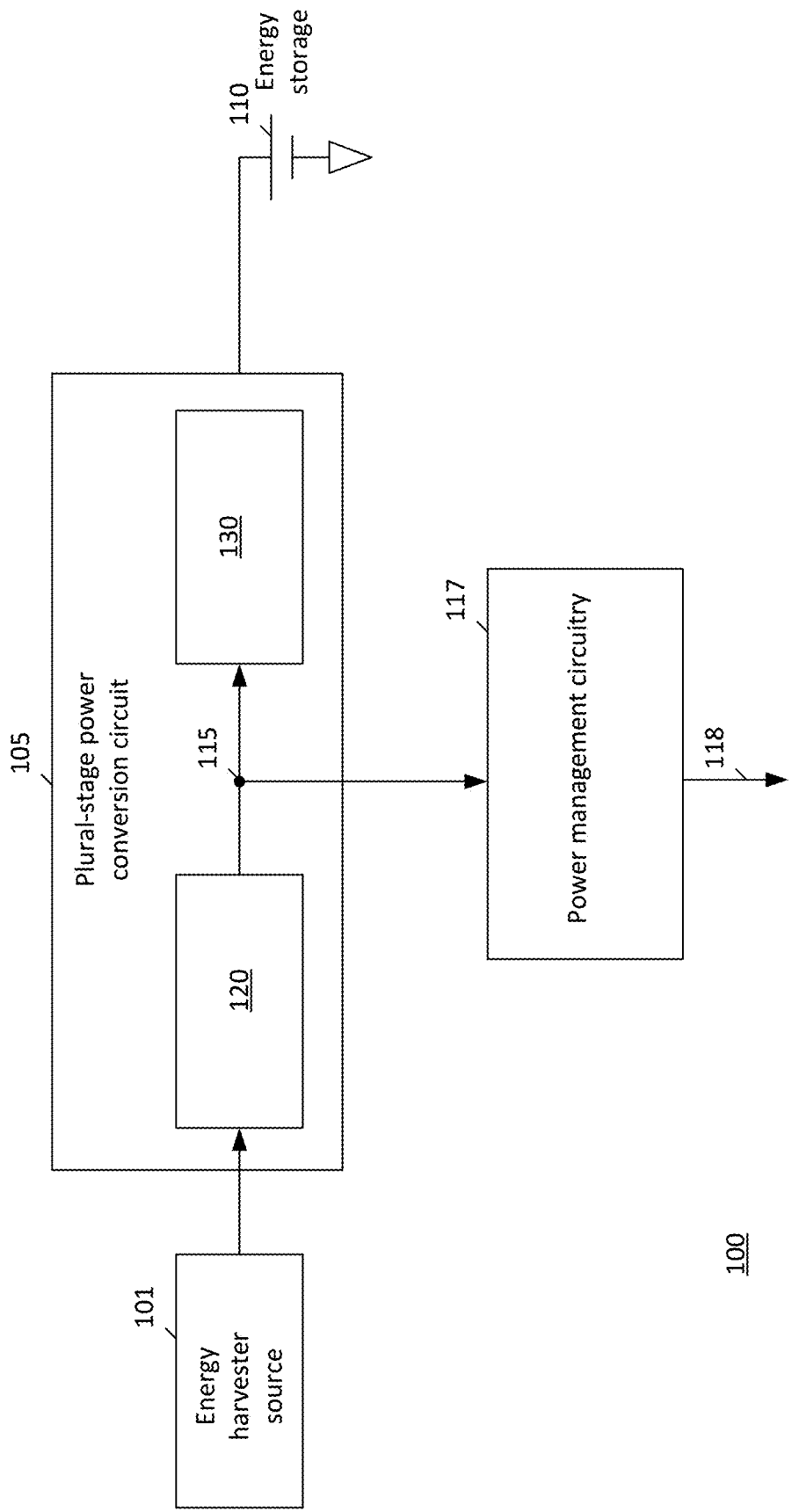
FIG. 1 is a simplified block diagram of at least one embodiment of a system that derives power output from an energy harvester source, according to various embodiments.

Apparatuses, methods and storage medium associated with deriving power output from an energy harvester are disclosed herein. In embodiments, an apparatus may include one or more processors, devices, and/or circuitry to identify a plurality of times at which an intermediate voltage of a two stage power conversion circuit corresponds to a voltage reference, and ascertain an amount of time between one of the identified times and another one of the identified times. The one or more processors, devices, and/or circuitry may derive a power or current value associated with the second power supply using the amount of time.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Direct power measurement, such as direct power measurement using physical sensing (e.g., current sensing) is used in some known energy harvesting power management systems, but may be associated with power loss and/or other disadvantages. Some of the embodiments disclosed herein may enable energy harvesting power management without using physically sensing and/or without directly measuring the power.

In some embodiments, a system may utilize inherited information of operations of a power processing unit (such as a cascade converter topology and its "inter-leave" operation) and general characteristics of an energy harvesting source to derive a power or current value. In some embodiments, a current or power value may be derived based on the convertor topology, circuit operation, timing control information, or the like, or combinations thereof.

Energy harvesting power management based on the derivation of the power or current value may reduce or eliminate power losses due to physical sensing. In addition to the reduction or removal of power loss, Bill Of Materials (BOM) costs may be reduced via elimination of discrete components associated with direct power management (such as an analog-to-digital to convert an analog signal from physical sensing to a digital value before it may be processed). These improvements may also contribute to a highly compacted and power efficient design, which may be suitable for SoC integration and/or IoT products such as a ubiquitous sensing node or a remote sensor on a small flying object such as an ultra-small drone or a bee.

FIG. 1 is a simplified block diagram of at least one embodiment of a system 100 that derives power output from an energy harvester source 101, according to various embodiments. Referring now to FIG. 1, system 100 may include power management circuitry 117 to determine a voltage at node 115. The voltage at node 115 may be an intermediate voltage (also referred to herein as $V_x$) of a plural-stage power conversion circuit 105 (e.g. a two-stage power conversion circuit) coupled between an energy harvester source 101 and an energy storage 110. The power management circuitry 117 may constantly compare the intermediate voltage to a voltage reference (also referred to herein as $V_{ref}$), and responsive to these constant comparisons, may derive values 118 indicating current or power output from the energy harvester source 101 at different times.

The derived values 118 may enable monitoring power output from the energy harvester source 101 without directly measuring power at the energy harvester source 101, e.g., without sensing current at a node between the energy harvester source 101 and plural-stage power conversion circuit 105. Accordingly, an electronic device utilizing harvested power (such as for purposes of illustration a remote sensor on a small flying object such as an ultra-small drone or a bee), need not include accoutrements typically added to such electronic devices for the purposes, e.g., the sole purpose, of measuring power output from the energy harvester source 101 (including but not limited to an analog to digital convertor or other components that may be dedicated to the measurement of power output from the energy harvester source 101).

In some embodiments, the power management circuitry 117 may include a comparator (not shown) to compare the intermediate voltage and the voltage reference, and a component to track time (not shown), such as a digital counter (such as a simple 8bit counter) or an analog circuit component (e.g., an analog integration sawtooth charge pump, a voltage-controlled oscillator, or the like, or combinations thereof). The power management circuitry 117 may include a Pulse Width Modulator (PWM) (not shown) to receive an output of the time tracking component. The power management circuitry 117 may include a processor (not shown), e.g., a SoC (system on chip) processor, to derive the power or current values using information from the time tracking component and/or the PWM.

In some embodiments, the system 100 includes one or more energy conversion devices (not shown) to acquire energy from the energy harvester source 101 (which may include more than energy harvester source in some embodiments). The one or more energy conversion sources may include a photovoltaic (PV) cell, a thermoelectric generator (TEG), a radio frequency (RF) device, a piezoelectric material, or the like, or combinations thereof. The one or more energy conversion devices may convert the acquired energy into the one or more first power supplies (not shown).

The plural-stage power conversion circuit 105 may include a first stage, e.g., a voltage regulation circuit 120 (such as a boost convertor, a buck convertor, a boost-buck convertor, or the like, or combinations thereof), to receive the first power supplies from the energy harvester source 101 to generate an intermediate voltage (the voltage regulation circuit 120 may have an input terminal coupled to each first power supply). In some embodiments, the voltage regulation circuit 120 may include a high speed switched converter (e.g., a 500 kHz switched converter, such as a 500 kHz switched boost convertor).

A second stage, e.g., switched capacitor charge pump 130, may receive the intermediate voltage and generate a second power supply. In some embodiments, switched capacitor charge pump 130 may be a charge-pump fix-ratio converter which may operate at a significantly lower frequency (e.g., one fifth to one tenth the frequency of the first stage, or less, such as 10 kHz).

In some embodiments, the power management circuitry 117 may identify a plurality of times at which the intermediate voltage corresponds to a voltage reference, and may ascertain an amount of time between one of the identified times and another one of the identified times. The identified times may correspond to different switching cycles of the switched capacitor charge pump 130. The identified times include a beginning of a charging of a capacitor (e.g., a flying capacitor, not shown) of the switched capacitor charge pump 130 and an end of a different charging of the capacitor.

In some embodiments, the power management circuitry 117 may initiate a digital counter (not shown) at a time corresponding to a discharge of the capacitor of the switched capacitor charge pump 130. The power management circuitry 117 may read a count of the digital counter at a time corresponding to the latter of two next discharges of the capacitor, and may ascertain the amount of time based on said count.

The power management circuitry 117 may derive a value of values 118 using the amount of time. The power management circuitry 117 may output the derived value of values 118 or store the derived value in a memory device. The power management circuitry 117 may repeat this process for subsequent cycles of the plural-stage power conversion circuit 105. The values 18 may represent indirect measurements of an electrical characteristic (such as power, current, etc.) of the output of the energy harvester source 101.

System 100, except for the arrangement disclosed herein to derive power from an energy harvester, may be any electronic, optical and/or magnetic systems. For examples, system 100 may be a wearable device, a smartphone, a computing tablet, a laptop computer, a desktop computer, a server, a set-top box, a game console, an industrial controller, a storage system, a networking equipment, and so forth.

Figure 2:
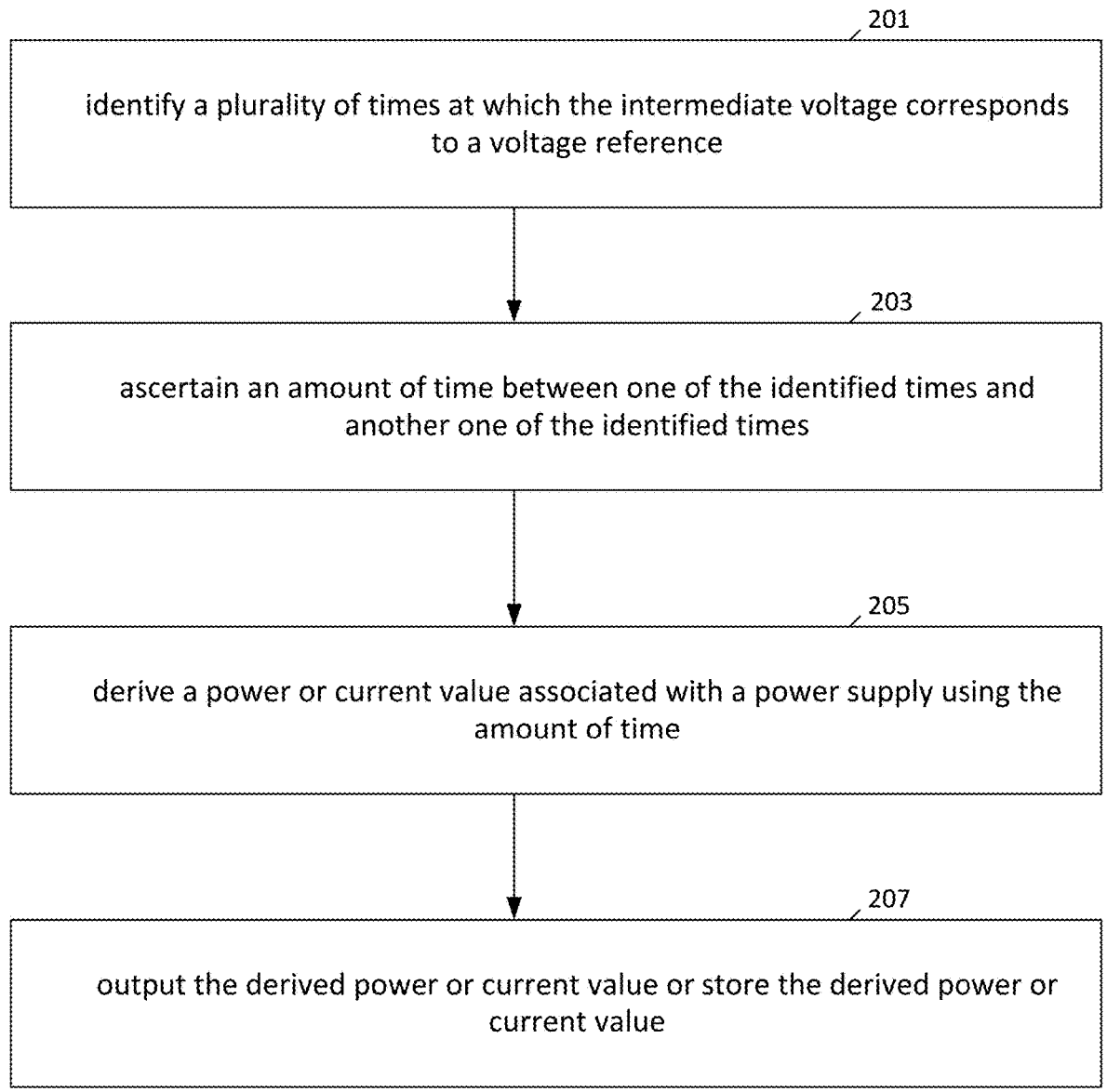
FIG. 2 is a simplified flow diagram of a method for deriving power output from an energy harvester source that may be executed by the system of FIG. 1, according to various embodiments.

FIG. 2 is a simplified flow diagram of a method for deriving power output from an energy harvester source 101 that may be executed by the system of FIG. 1, according to various embodiments.

In block 201, the power management circuitry 117 (FIG. 1) may identify a plurality of times at which the intermediate voltage corresponds to a voltage reference. In block 203, the power management circuitry 117 may ascertain an amount of time between one of the identified times and another one of the identified times.

In block 205, the power management circuitry 117 may derive a power or current value associated with a supply using the amount of time. In block 207, the power management circuitry 117 may output the derived power or current value or store the derived power or current value in a memory device, such as a register, a buffer, or the like, or combinations thereof.

Figure 3:
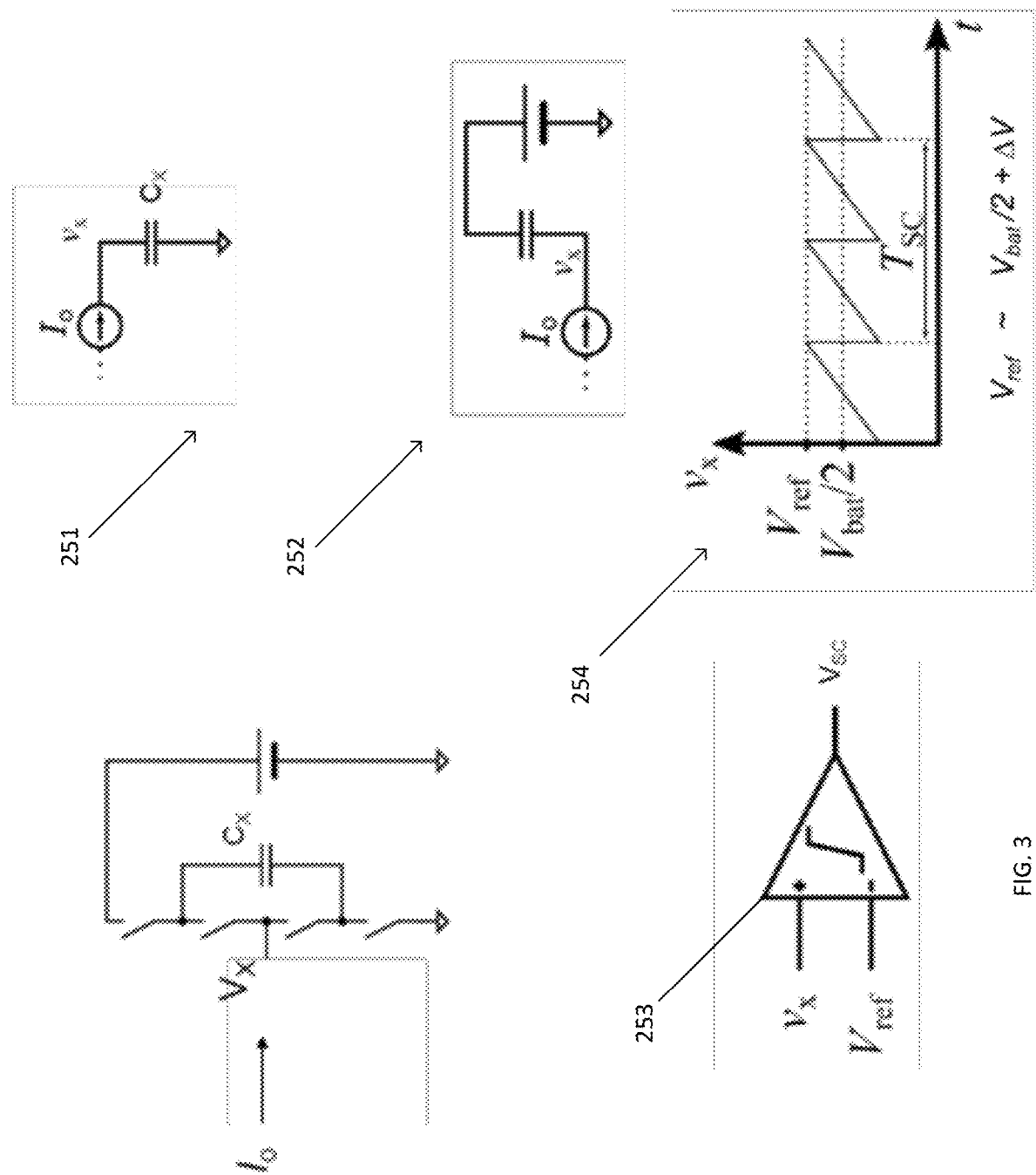
FIG. 3 illustrates a block diagram for operation modes of the switched capacitor charge pump of FIG. 1, and a graph depicting the intermediate voltage and time, according to various embodiments.

FIG. 3 illustrates a block diagram for operation modes of the switched capacitor charge pump of FIG. 1, and a graph depicting the intermediate voltage and time, according to various embodiments.

In some embodiments, the voltage regulation circuit 120 may be considered as a current source $I_o$ for static analysis of operation, e.g., may act like a charge-pump with a constant input current source that charges the switched capacitor charge pump 130. The current source $I_o$ may be proportional to the power output of the energy harvester source 101.

In some embodiments, an operation of the switched capacitor charge pump 130 is completed in two cycles. In a first cycle 251, the capacitor of the switched capacitor charge pump 130 may be charged. The capacitor may release the charge to a battery or a storage element in the second cycle 252. This may be referred to as "soft charging (SC)".

In some embodiments, the SC switching cycle may be controlled so that a fixed conversion ratio may be achieved. An example on the implementation with a 1:2 ratio is illustrated in graph 254, which illustrates a 1:2 ratio SC converter control and waveform. The graph 254 illustrates two cycles to complete a charge/release operation in the time interval of $T_{SC}$. Considering the illustrated operation, the duration of Tsc may be $4C_x(V_{ref}-V_{bat}/2)/I_o$ (where $V_{bat}$ is a voltage of a second power supply (not shown) coupled to an output of switched capacitor charge pump 130)

Comparator 253 (which may be a component of power management circuitry 117 of FIG. 1, in some implementations) may receive the intermediate voltage and the voltage reference ($V_{ref}$), and may output a soft charging voltage ($V_{SC}$). An output of the comparator 253 may indicate a state transition of the switched capacitor charge pump 130 (e.g., transition to or from the state corresponding to first cycle 251 from or to the state corresponding to the second cycle 252). In some examples, the switched capacitor charge pump 130 switches on a rising edge of $V_{SC}$.

For the sake of MPPT (Maximum Power Point Track), for a given energy harvesting source, the value of $V_{ref}-V_{bat}/2$ may be considered as approximately constant, and as such, a period of SC ($T_{SC}$) may be approximately proportional to $1/\rho$. Therefore, input power (e.g., power input to the second stage) may be inversely proportional to $T_{SC}$. Power may be tracked and determined with the time interval of $T_{SC}$ through a digital counter or other time tracking component.

Figure 4:
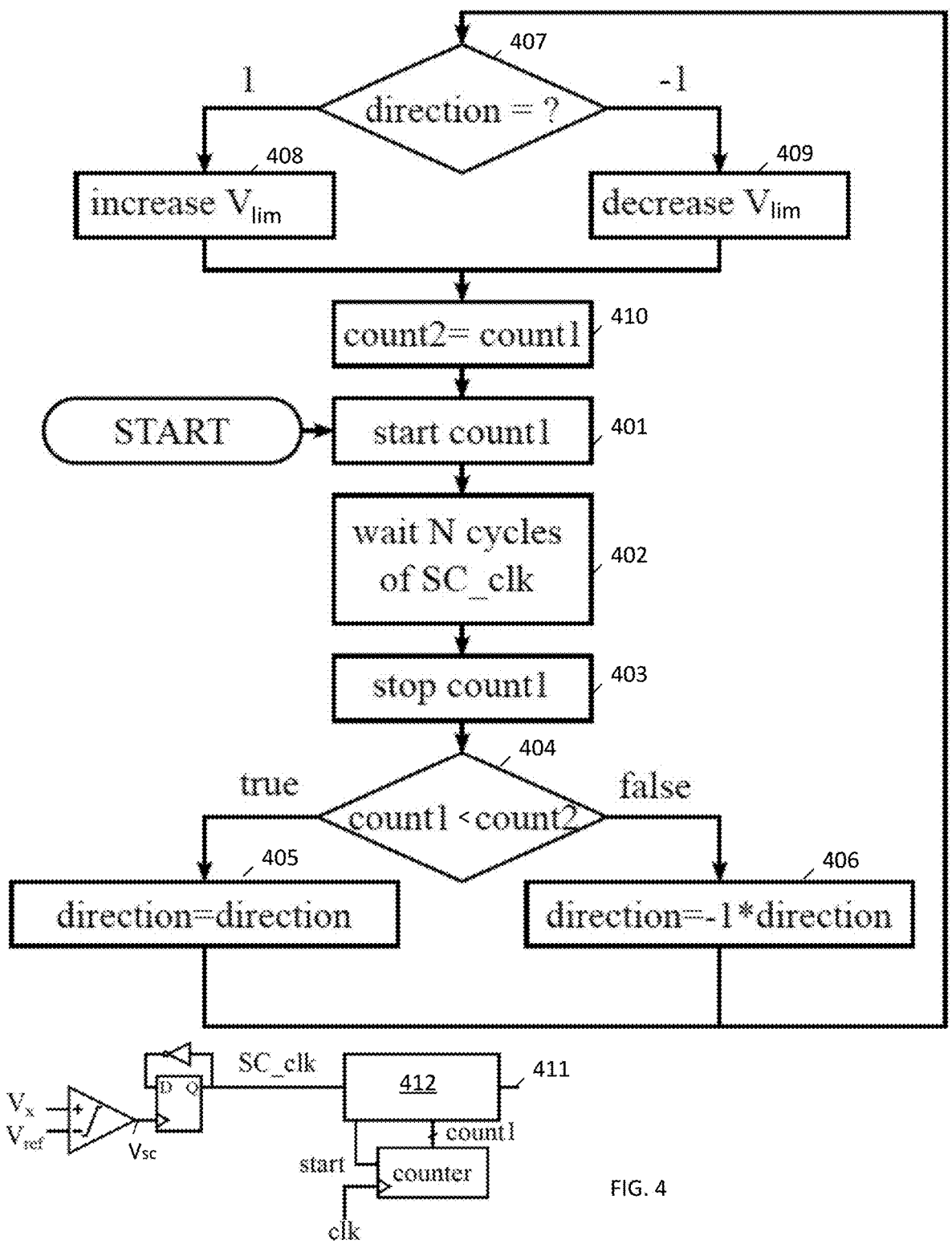
FIG. 4 is a detailed flow diagram of a method of power tracking and tuning that may be executed by the system of FIG. 1, according to various embodiments.

FIG. 4 is a detailed flow diagram of a method of power tracking and tuning that may be executed by the system 100 of FIG. 1, according to various embodiments.

The input impedance to the plural-stage power conversion circuit 105, or an output impedance of the system 100, may be tuned with a signal from the power management circuitry 117 to the voltage regulation circuit 120 (hereinafter $V_{lim}$). For example, the power management circuitry 117 may apply $V_{lim}$ to adjust a characteristic of the voltage regulation circuit 120, e.g., the duty cycle of a PWM control signal.

In block 401, controller 412 may signal a counter to start. In block 402, controller 412 may wait N cycles of a reference clock of the counter (in an example N is a predetermined value, such an integer).

In block 403, the controller 412 may stop the counter and determine whether a count of the counter is less than a stored count (e.g., a count from a previous iteration). If the count is less than the stored count in diamond 404, then in block 405 the controller 412 may determine to set a direction of $V_{lim}$ to a same direction as a previous iteration. If the count is not less than the stored count in diamond 404, then in block 406 the controller 412 may determine to set the direction of $V_{lim}$ to a different direction than the previous iteration (such as decrement if the previous iteration was increment).

Figure 5:
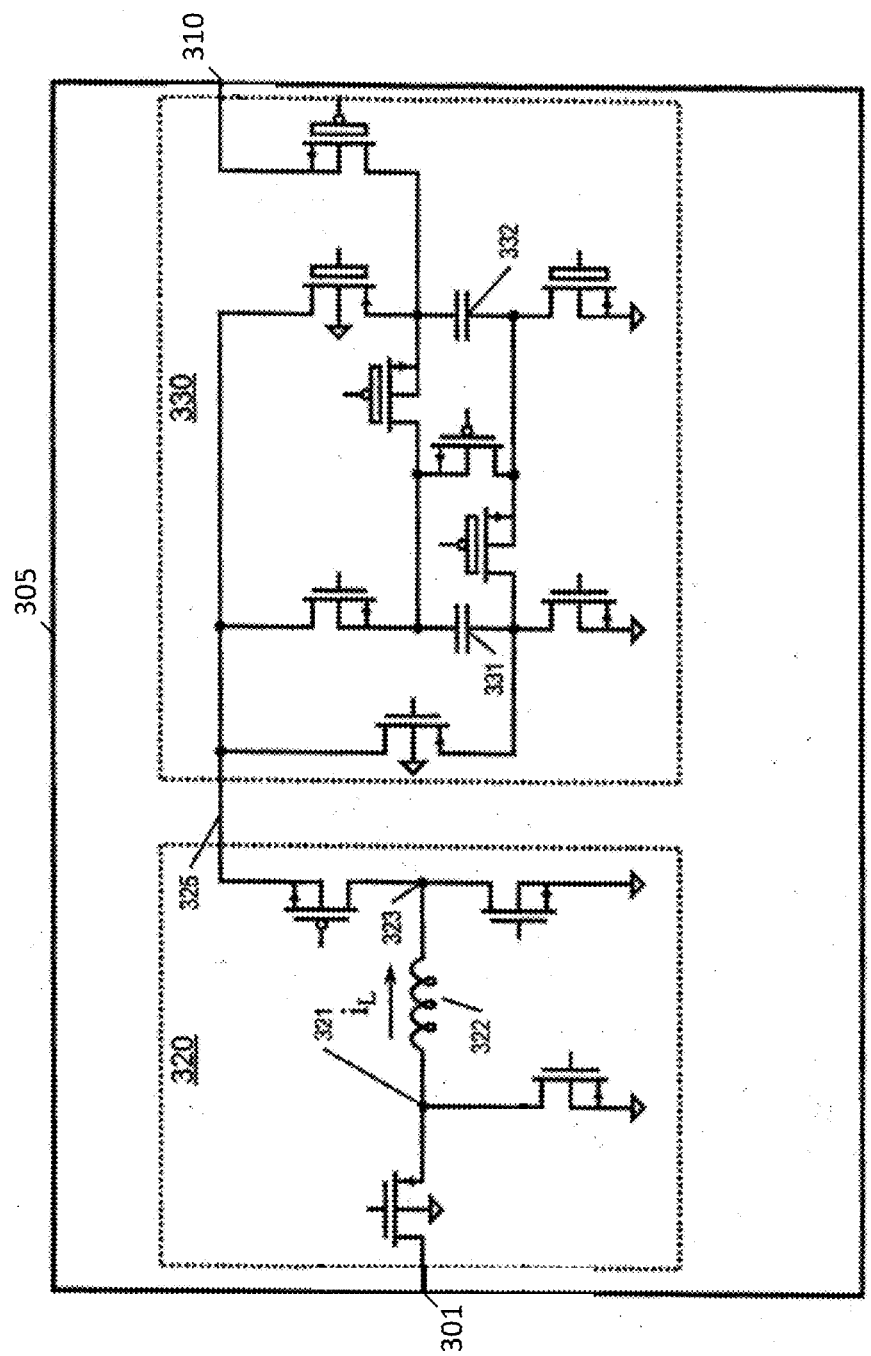
FIG. 5 is a detailed circuit diagram illustrating a plural-stage power conversion circuit that may be used in a system for deriving power output from an energy harvester, according to various embodiments.

In diamond 407, the controller 412 may apply the determined direction (e.g., the controller 412 may perform a voltage increment in block 408 or apply a voltage decrement in block 409 to change an output voltage 411 ($V_{lim}$)). In some examples, $V_{lim}$ may be input into a controller that controls the gate signals to the FETs of boost converter 320 (FIG. 5). Referring again to FIG. 4, in block 410, the controller 412 may store a current count and may perform a next iteration of the process.

FIG. 5 is a detailed circuit diagram illustrating a plural-stage power conversion circuit 305 that may be used in a system for deriving power output from an energy harvester, according to various embodiments.

In one embodiment, plural-stage power conversion circuit 305 may include an input terminal 301 that may be coupled to one or energy harvesting sources (not shown). In the illustration one input terminal 301 and one field-effect transistors (FET) is shown between input terminal 301 and node 321 to couple to one energy harvesting source, but it should be appreciated that in examples with more than one energy harvesting source, more than one of such FETs may be coupled in parallel between node 321 and a respective one of the input terminals for the more than one energy harvesting sources. The output terminal 310 may be coupled to an energy storage (not shown).

Each harvesting energy source may provide an input power supply to plural-stage power conversion circuit 305, where each input power supply may be identical or different to the other energy sources and may be provided at the same or different time as the other energy sources. In one embodiment, multiple energy conversion devices, based on sunlight, heat, piezoelectricity (vibration), and any other energy source, are configured to acquire energy from multiple harvesting energy sources and convert the acquired energy into one or more input power supplies.

According to one embodiment, plural-stage power conversion circuit 305 may include boost converter 320 and switched capacitor charge pump 330. Plural-stage power conversion circuit 305 may provide a two-stage hybrid switching topology to charge a battery (and power a load). For example, plural-stage power conversion circuit 305 may include a high frequency boost converter in the frontend stage, and a switched capacitor charging pump converter that may operate at a lower frequency (e.g., 5×-10× slower, or more) in the back-end stage. The two-stage hybrid switching topology may provide a soft-charging charge pump that may provide relatively no charge sharing losses and smaller capacitors operating at a lower frequency. The two-stage hybrid switching topology also may provide a low voltage boost converter that may provide a higher switching frequency, a smaller inductor, and a smaller decoupling capacitor.

In one embodiment, boost converter 320 may generate an intermediate power supply (e.g., intermediate voltage 325), which may be a boosted higher power supply compared to the input power supply. According to one embodiment, switched capacitor charge pump 330 may receive the intermediate power supply and may generate/bump a higher second power supply (e.g., $V_{bat}$, not shown) using the intermediate power supply. For example, switched capacitor charge pump 330 may receive an intermediate voltage and pump that intermediate voltage using switch capacitors (e.g., capacitors 331 and 332) to generate an output power supply at a fixed ratio, e.g., 1:2/1:3 (for a fixed ratio of refers to 1:2/1:3 the output power supply that may be generally twice/three times higher than the intermediate voltage).

As such, output terminal 310 may receive the higher second power supply ($V_{bat}$) and may forward the higher second power supply to charge a battery and power a load. In one embodiment, boost converter 320 includes node 321, inductor 322 ($i_L$), node 323, and intermediate voltage 325. According to one embodiment, boost converter 320 may be configured to "boost" its output to an intermediate voltage level, which may generally increase the power conversion efficiency. In addition, since boost converter 320 may operate with a low voltage circuit/components (e.g., harvesting energy sources that may be <~2.5V), a more efficient low-voltage/high-frequency silicon process may be applied. The front-end circuit may operate in high-frequency in order to meet a desired fast dynamic response, while also maintaining power efficiency.

In one embodiment, node 321 may receive an input power supply that may be controlled by a field-effect transistors (FET). Inductor 322 may be coupled between nodes 321 and 323. Furthermore, inductor 322 may receive the input power supply via node 321 and may generate an output voltage level that may be forwarded to node 323, which may be controlled by FETs and coupled between an intermediate voltage and a ground. Inductor 322 may be a switching inductor but is not limited to a particular type of inductor.

The overall power delivery efficiency of an energy harvesting may be affected by the front-end boost converter. For example, using a 4.7 uH switching inductor, an energy harvester utilizing plural-stage power conversion circuit 305 may generate acceptable overall power efficiency for IoT devices and applications. Also, overall power efficiency may be greater (e.g., when using a 1 uH switching inductor) when there is a demand for an even smaller foot print design. Note that the architecture may be naturally "expendable" to multiple harvesting sources, since it may utilize the switching inductor (e.g., switching inductor 322) of the front-end boost converter (e.g., boost converter 320) in such a method where a total energy from a plurality of input energy sources may be harvested & delivered effectively to charge a battery and power a load.

In some embodiments, boost converter 320 may provide a DCM (discontinuous conduction mode) operation that may include receiving one or more input energy sources and generating one or more output power supplies. In one embodiment, boost converter 320 may include one or more outputs using inductor 322 and the multiple inputs from node 321. For example, there could be more than one high-side device connected to node 323, where each of the additional outputs may be a low voltage device (e.g., a processor such as an SoC processor). Furthermore, in one embodiment, each additional output (or all the outputs) from boost converter 320 may be regulated and configured, for example, to only supply the excess energy from the energy sources to the battery. In another embodiment, an energy harvester utilizing plural-stage power conversion circuit 305 may include a battery-operating mode. In the battery-operating mode, a battery may operate as a power source and supply power when the input power supply from energy harvesting sources is not sufficient (e.g., the input power supplies fall below a low voltage threshold).

In one embodiment, switched capacitor charge pump 330 may include intermediate voltage 325, capacitors 331 and 332, and supply voltage 333 (e.g., Vbat). Switched capacitor charge pump 330 may operate in a step-up mode with a fixed conversion ratio (1:2, 1:3, etc.), which may be self-adapted to an input source. The back-end charge pump of plural-stage power conversion circuit 305 may also provide a high overall power efficiency (e.g., efficiency at 95%~98%). According to one embodiment, switched capacitor charge pump 330 may receive intermediate voltage 325 and may generate/bump supply voltage 333 ($V_{bat}$) using the intermediate voltage 325, capacitors 331 and 332, and multiple FETs. Furthermore, intermediate voltage 325 may operate within a threshold range (e.g., upper and lower voltage thresholds), which may dynamically change based on the supply voltage 333 ($V_{bat}$). For example, if supply voltage 333 ($V_{bat}$) rises above the threshold range, the conversion ratio of the switched capacitor charge pump 330 may be increased (e.g., from 1:2 to 1:3). Therefore, when the conversion rate is changed, the threshold range for intermediate voltage 325 may also be changed.

For example, when the switched capacitor charge pump 330 is in a 1:2 mode, the threshold for intermediate voltage 325 may be ($V_{bat}/2$) plus a voltage window/range, and in a 1:3 mode the threshold for the intermediate voltage 325 may be changed to ($V_{bat}/3$) plus a voltage window/range. As such, the voltage may be contained within an operating voltage range to maintain the intermediate voltage 325 within the voltage rating of the boost converter. Note that the voltage window may be the same or different in different modes. Furthermore, to avoid from switching back and forth in the presence of noise, switched capacitor charge pump 330 also may include a small hysteresis band to account for the presence of noise according to one embodiment.

In one embodiment, switched capacitor charge pump 330 may charge into and out of capacitors 331 and 332 when the FETs (or switches) are opened and closed. Note that switched capacitor charge pump 330 may not be limited to a particular charge pump configuration. Switched capacitor charge pump 330 may include a charging phase, a discharging phase, and a transition state (e.g., the moment the pump is triggered from a charging phase to a discharging phase). During the charge phase according to one embodiment, capacitor 331 may operate as a flying capacitor (CFLY) and may be charged to a predetermined voltage. During the discharge phase according to one embodiment, capacitor 331 may be placed in series with the battery and discharged into the load and capacitor 332, which may effectively provide a fixed ratio of double/triple the supply voltage (Vbat) to the load. Therefore, intermediate voltage 325 325 may control a transition state in switched capacitor charge pump 330 (e.g., from a charging phase to a discharge phase). The transition state may be triggered when intermediate voltage 325 reaches an upper threshold (which may also change based on the chosen conversion ratio). Furthermore, the state transition may only be triggered after a complete pulse from boost converter 320, not during a pulse. Accordingly, intermediate voltage 325 may be sampled after a pulse has completed and then switched capacitor charge pump 330 may decide whether to trigger a transition or not based on intermediate voltage 325 and $V_{bat}$.

In some examples, $V_{lim}$ may be input into a controller that controls the gate signals to the FETs of boost converter 320. In some examples, the voltage $V_{bat}$ may be input into a controller that controls the gate signals to the FETs of switched capacitor charge pump 330.

Figure 6:
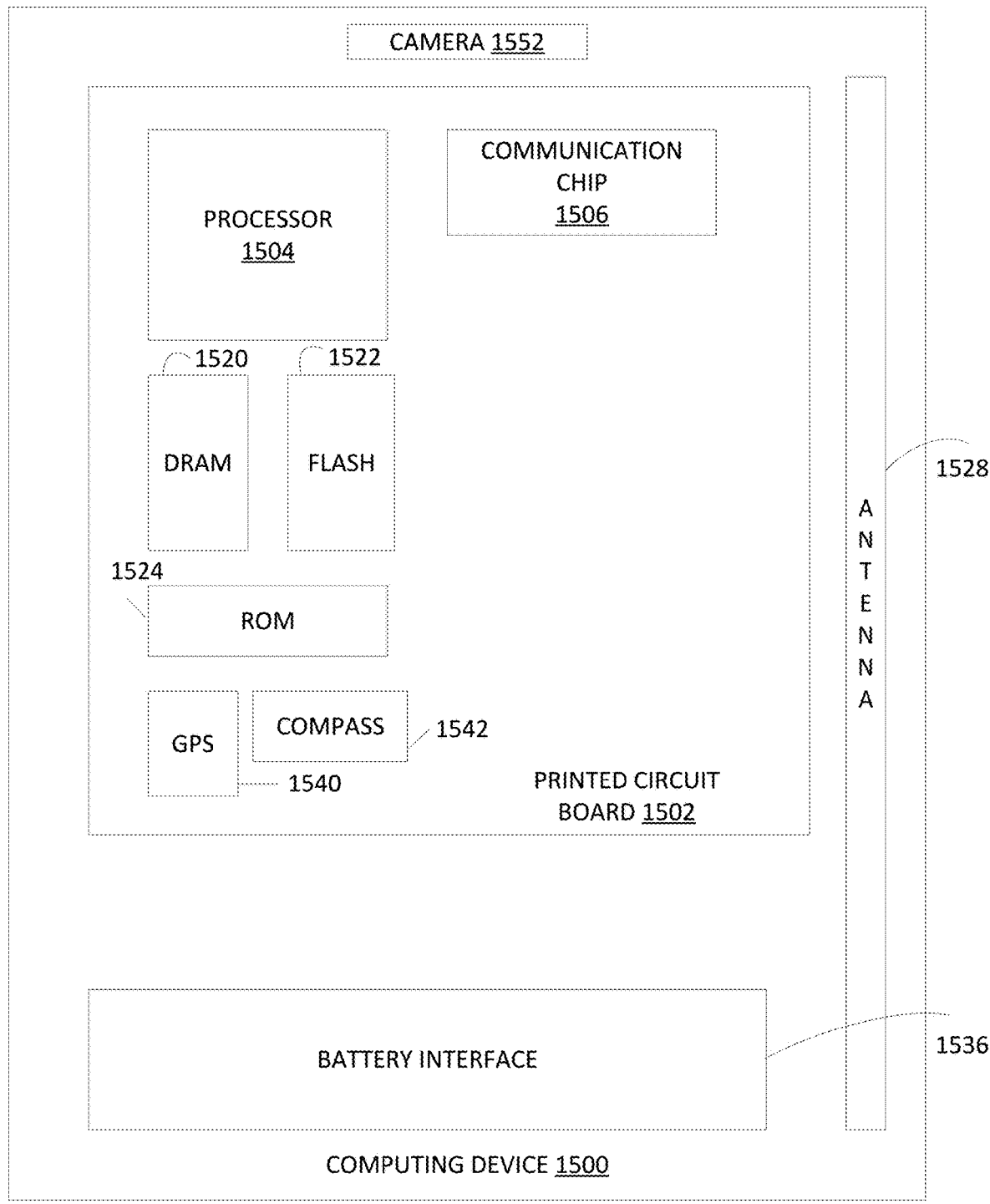
FIG. 6 illustrates an example computing device that may employ the apparatuses and/or methods described herein, according to various embodiments.

FIG. 6 illustrates an example computing device that may employ the apparatuses and/or methods described herein, according to various embodiments. As shown, example computing device 1500 may include in particular, battery interface 1536, which may include the earlier described method and arrangement for deriving energy from a plurality of energy harvesters (with references to FIGS. 1-5), and provide the derived energy to power various components of computing device 1500.

In some embodiments, various components of computing device 1500 of an IoT device may include one or more processor(s) 1504 and the at least one communication chip 1506, which may be physically and electrically coupled to the one or more processor(s) 1504. In further implementations, the communication chip 1506 may be part of the one or more processor(s) 1504. In various embodiments, computing device 100 may include printed circuit board (PCB) 1502. For these embodiments, the one or more processor(s) 1504 and communication chip 1506 may be disposed thereon. In alternate embodiments, the various components may be coupled without the employment of PCB 1502.

Depending on its applications, computing device 1500 may include other components that may or may not be physically and electrically coupled to the PCB 1502. These other components include, but are not limited to, a memory controller (not shown), volatile memory (e.g., dynamic random access memory (DRAM) 1520), non-volatile memory such as read only memory (ROM) 1524, flash memory 1522, an I/O controller (not shown), a digital signal processor (not shown), a crypto processor (not shown), one or more antenna 1528, a global positioning system (GPS) device 1540, a compass 1542, an accelerometer (not shown), a gyroscope (not shown), a speaker (not shown), and a camera 1552, and so forth.

In some embodiments, the one or more processor(s) 1504, flash memory 1522, and/or a storage device (not shown) may include associated firmware (not shown) storing programming instructions configured to enable computing device 1500, in response to execution of the programming instructions by one or more processor(s) 1504, to execute an operation system and one or more user applications, which may be any known operating system and user applications.

The communication chips 1506 may enable wired and/or wireless communications for the transfer of data to and from the computing device 1500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 5G, 5G, and beyond. The computing device 1500 may include a plurality of communication chips 1506. For instance, a first communication chip 1506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others (e.g., developed or yet to be developed).

In various implementations, the computing device 1500 may be an IoT product such as a ubiquitous sensing node or a remote sensor. In further implementations, the computing device 1500 may be any other electronic device that processes and/or stores data.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

EXAMPLES

Example 1 is a system to derive power from one or more energy harvester sources. The system may include: a voltage regulation circuit to receive one or more first power supplies from the one or more energy harvester sources and to generate an intermediate voltage, the voltage regulation circuit having one or more input terminals coupled to the one or more first power supplies; a switched capacitor charge pump to receive the intermediate voltage and to generate a second power supply; and power management circuitry. The power management circuitry may be configured to: identify a plurality of times at which the intermediate voltage corresponds to a voltage reference; ascertain an amount of time between one of the identified times and another one of the identified times; derive a power or current value associated with the second power supply using the amount of time; and output the derived power or current value or store the derived power or current value in a memory device.

Example 2 includes the subject matter of example 1, and the power management circuitry includes a digital counter.

Example 3 includes the subject matter of any of examples 1-2, and the power management circuitry includes a pulse width modulator to receive an output of the digital counter.

Example 4 includes the subject matter of any of examples 1-3, and the power management circuitry includes an analog circuit component, the power management circuitry to ascertain the amount of time using the analog circuit component.

Example 5 includes the subject matter of any of examples 1-4, and the analog circuit component includes at least one of an analog integration sawtooth charge pump or a voltage-controlled oscillator.

Example 6 includes the subject matter of any of examples 1-5, and the identified times correspond to different switching cycles of the switched capacitor charge pump.

Example 7 includes the subject matter of any of examples 1-6, and the identified times include a beginning of a charging of a capacitor of the switched capacitor charge pump and an end of a different charging of the capacitor.

Example 8 includes the subject matter of any of examples 1-7, the power management circuitry to ascertain an amount of time between a discharge of a capacitor of the switched capacitor charge pump and a time of a subsequent discharge of the capacitor.

Example 9 includes the subject matter of any of examples 1-8, the power management circuitry to: initiate a digital counter at a time corresponding to a discharge of a capacitor of the switched capacitor charge pump; and read a count of the digital counter at a time corresponding to the latter of two next discharges of the capacitor; and ascertain the amount of time based on said count.

Example 10 includes the subject matter of any of examples 1-9, and a frequency of operation of the voltage regulation circuit is greater than a frequency of operation of the switched capacitor charge pump.

Example 11 is a method of deriving power from one or more energy harvester sources. The method includes identifying a plurality of times at which an intermediate voltage corresponds to a voltage reference, the intermediate voltage corresponding to a node between a plurality of stages of a plural-stage power conversion circuit; ascertaining an amount of time between one of the identified times and another one of the identified times; deriving a power or current value at one or more outputs of the one or more energy harvester sources using a result of the ascertainment; and outputting the derived power or current value or storing the derived power or current value in a memory device.

Example 12 includes the subject matter of example 11, and initiating a count at a time corresponding to a discharge of a capacitor of the switched capacitor charge pump; and reading a value of the count at a time corresponding to the latter of two next discharges of the capacitor; and ascertaining the amount of time based on said read value.

Example 13 includes the subject matter of any of examples 11-12, and the derived power or current value represents an indirect measurement of an electrical characteristic of the output of the one or more energy harvester sources.

Example 14 includes the subject matter of any of examples 11-13, and the measurement is obtained without sensing the electrical characteristic.

Example 15 includes the subject matter of any of examples 11-14, and acquiring energy from the one or more harvesting sources; converting the acquired energy into one or more power supplies; and powering an input of a first stage of the plural-stage power conversion circuit using the one or more of power supplies; wherein the one or more energy conversion sources includes at least one of a photovoltaic (PV) cell, a thermoelectric generator (TEG), a radio frequency (RF) device, or a piezoelectric material.

Example 16 is power management circuitry to derive power at an output of one or more energy harvester sources, the power management circuitry comprising: a comparator having a plurality of inputs including a voltage reference and an intermediate voltage corresponding to a node between a plurality of stages of a plural-stage power conversion circuit; a digital counter having a plurality of inputs including a clock and an input coupled to an output of the comparator; and a power management module. The power management module may be configured to: initiate and read the digital counter based on an output of the comparator; determine an amount of time based on count information of the digital counter; and derive a power or current value at the output of the one or more energy harvester sources based on the determined amount of time.

Example 17 may include the subject matter of example 16, and a pulse width modulator to receive an output of the digital counter.

Example 18 may include the subject matter of any of examples 16-17, and the power management module to initiate the digital counter and read the digital counter during different switching cycles of the switched capacitor charge pump.

Example 19 may include the subject matter of any of examples 16-18, and the power management module to: initiate the digital counter at a time corresponding to a discharge of a capacitor of the switched capacitor charge pump; and read a count of the initiated digital counter at a time corresponding to the latter of two next discharges of the capacitor; and determine the amount of time based on said count.

Example 20 may include the subject matter of any of examples 16-19, and one or more energy conversion devices to acquire energy from the one or more of energy harvester sources and to convert the acquired energy into one or more power supplies; wherein the one or more energy conversion sources includes at least one of a photovoltaic (PC) cell, a thermoelectric generator (TEG), a radio frequency (RF) device, or a piezoelectric material.

Example 21 is an apparatus for deriving power at an output of one or more energy harvester sources, the apparatus comprising: means for identifying a plurality of times at which an intermediate voltage corresponds to a voltage reference, the intermediate voltage corresponding to a node between a plurality of stages of a plural-stage power conversion circuit; means for ascertaining an amount of time between one of the identified times and another one of the identified times; means for deriving a power or current value at the output of the one or more energy harvester sources using a result of the ascertainment; and means for outputting the derived power or current value or storing the derived power or current value in a memory device.

Example 22 includes the subject matter of example 21, and means for initiating a count at a time corresponding to a discharge of a capacitor of the switched capacitor charge pump; and means for reading a value of the count at a time corresponding to the later of two next discharges of the capacitor; and means for ascertaining the amount of time based on said read value.

Example 23 includes the subject matter of any of examples 21-22, and the derived power or current value represents an indirect measurement of an electrical characteristic of the output of the one or more energy harvester sources.

Example 24 includes the subject matter of any of examples 21-23, and the measurement is obtained without sensing the electrical characteristic.

Example 25 includes the subject matter of any of examples 21-24, and means for acquiring energy from the one or more energy harvesting sources; means for converting the acquired energy into one or more power supplies; and means for powering an input of a first stage of the plural-stage power conversion circuit using the one or more power supplies; wherein the one or more energy conversion sources includes at least one of a photovoltaic (PV) cell, a thermoelectric generator (TEG), a radio frequency (RF) device, or a piezoelectric material.

Example 26 is a computer-readable medium having instructions for implementing physical programming stored thereon that, in response to execution by a processing device, cause the processing device to perform operations, to: identify a plurality of times at which an intermediate voltage corresponds to a voltage reference, the intermediate voltage corresponding to a node between a plurality of stages of a plural-stage power conversion circuit; ascertain an amount of time between one of the identified times and another one of the identified times; derive a power or current value at one or more outputs of one or more energy harvester sources using a result of the ascertainment; and output the derived power or current value or store the derived power or current value in a memory device.

Example 27 includes the subject matter of example 26, and the instructions are further operable to: initiate a count at a time corresponding to a discharge of a capacitor of the switched capacitor charge pump; and read a value of the count at a time corresponding to the latter of two next discharges of the capacitor; and ascertain the amount of time based on said read value.

Example 28 includes the subject matter of any of examples 26-27, wherein the derived power or current value represents an indirect measurement of an electrical characteristic of the output of the one or more energy harvester sources.

Example 29 includes the subject matter of any of examples 26-28, wherein the measurement is obtained without sensing the electrical characteristic.

Example 30 includes the subject matter of any of examples 26-29, and the operations are further to: acquire energy from the one or more harvesting sources; convert the acquired energy into one or more power supplies; and power an input of a first stage of the plural-stage power conversion circuit using the one or more of power supplies; wherein the one or more energy conversion sources includes at least one of a photovoltaic (PV) cell, a thermoelectric generator (TEG), a radio frequency (RF) device, or a piezoelectric material.

What is claimed is:

1. A circuit comprising:
   a comparator to compare a voltage reference and an intermediate voltage that corresponds to a node between a plurality of stages of a plural-stage power conversion circuit;
   a digital counter to receive a clock signal and an output of the comparator; and
   a power management circuit to:
      initiate and read count information of the digital counter based on an output of the comparator;
      determine an amount of time based on the count information of the digital counter; and
      derive a power or current value based on the determined amount of time.

2. The circuit of claim 1, further comprising a pulse width modulator to receive the count information of the digital counter.

3. The circuit of claim 1, wherein the power management circuit is further to initiate the digital counter and read the digital counter during different switching cycles of a switched capacitor charge pump.

4. The circuit of claim 3, wherein the power management circuit is further to:
   initiate the digital counter at a time corresponding to a discharge of a capacitor of the switched capacitor charge pump; and
   read a count of the initiated digital counter at a time corresponding to the latter of two next discharges of the capacitor; and
   determine the amount of time based on said count.

5. The circuit of claim 1, wherein the derived power or current value corresponds to an output of one or more energy harvester sources.

6. The circuit of claim 5, further comprising:
one or more energy conversion devices to acquire energy from the one or more energy harvester sources and to convert the acquired energy into one or more power supplies;
wherein the one or more energy harvester sources includes at least one of a photovoltaic (PC) cell, a thermoelectric generator (TEG), a radio frequency (RF) device, or a piezoelectric material.

7. A non-transitory computer-readable medium having instructions for implementing physical programming stored thereon that, in response to execution by a processing device, cause the processing device to perform operations, to:
identify a plurality of times at which an intermediate voltage corresponds to a voltage reference, the intermediate voltage corresponding to a node between a plurality of stages of a plural-stage power conversion circuit;
determine an amount of time between one of the identified times and another one of the identified times; and
derive a power or current value at one or more outputs of one or more energy harvester sources based on the determined amount of time.

8. The non-transitory computer-readable medium of claim 7, wherein the instructions are further to cause the processing device to output the derived power or current value or store the derived power or current value in a memory device.

9. The non-transitory computer-readable medium of claim 7, wherein the identified times correspond to different switching cycles of a switched capacitor charge pump.

10. The non-transitory computer-readable medium of claim 9, wherein the instructions are further to cause the processing device to:
initiate a count at a time corresponding to a discharge of a capacitor of the switched capacitor charge pump;
read a value of the count at a time corresponding to the latter of two next discharges of the capacitor; and
determine the amount of time based on the read value.

11. The non-transitory computer-readable medium of claim 7, wherein the derived power or current value represents an indirect measurement of an electrical characteristic of the output of the one or more energy harvester sources.

12. The non-transitory computer-readable medium of claim 11, wherein the measurement is obtained without sensing the electrical characteristic.

13. The non-transitory computer-readable medium of claim 7, wherein the instructions are further to cause the processor to:
acquire energy from the one or more energy harvester sources;
convert the acquired energy into one or more power supplies; and
power an input of a first stage of the plural-stage power conversion circuit using the one or more of power supplies.

14. The non-transitory computer-readable medium of claim 7, wherein the one or more energy harvester sources includes at least one of a photovoltaic (PV) cell, a thermoelectric generator (TEG), a radio frequency (RF) device, or a piezoelectric material.

15. An apparatus for deriving power at an output of one or more energy harvester sources, the apparatus comprising:
means for identifying a plurality of times at which an intermediate voltage corresponds to a voltage reference, the intermediate voltage corresponding to a node between a plurality of stages of a plural-stage power conversion circuit;
means for determining an amount of time between one of the identified times and another one of the identified times; and
means for deriving a power or current value at the output of the one or more energy harvester sources based on the determined amount of time.

16. The apparatus of claim 15, wherein the identified times correspond to different switching cycles of a switched capacitor charge pump.

17. The apparatus of claim 16, further comprising:
means for initiating a count at a time corresponding to a discharge of a capacitor of the switched capacitor charge pump; and
means for reading a value of the count at a time corresponding to the latter of two next discharges of the capacitor;
wherein the means for determining the amount of time is to determine the amount of time based on the read value.

18. The apparatus of claim 15, wherein the derived power or current value represents an indirect measurement of an electrical characteristic of the output of the one or more energy harvester sources.

19. The apparatus of claim 15, further comprising:
means for acquiring energy from the one or more harvester sources;
means for converting the acquired energy into one or more power supplies; and
means for powering an input of a first stage of the plural-stage power conversion circuit using the one or more of power supplies.

20. The apparatus of claim 15, wherein the one or more energy harvester sources includes at least one of a photovoltaic (PV) cell, a thermoelectric generator (TEG), a radio frequency (RF) device, or a piezoelectric material.

* * * * *